United States Patent [19]

Forster et al.

[11] Patent Number: 4,725,446

[45] Date of Patent: Feb. 16, 1988

[54] TABLET COATING APPARATUS AND METHOD

[75] Inventors: Eric Forster, Formby; Kenneth L. Morrow, Whiston, both of England

[73] Assignee: Manesty Machines Limited, Liverpool, England

[21] Appl. No.: 924,128

[22] Filed: Oct. 28, 1986

Related U.S. Application Data

[63] Continuation of Ser. No. 805,188, Dec. 4, 1985, abandoned.

[30] Foreign Application Priority Data

Dec. 11, 1984 [GB] United Kingdom ................. 8431167

[51] Int. Cl.⁴ .............................................. A61K 9/20
[52] U.S. Cl. .............................. 427/3; 118/19;
 118/20; 118/303; 118/320; 427/242; 427/377;
 427/425
[58] Field of Search .................. 427/3, 245, 242, 377;
 118/19, 20, 303, 320

[56] References Cited

U.S. PATENT DOCUMENTS

| | | | |
|---|---|---|---|
| 2,625,903 | 1/1953 | Opie | 118/19 |
| 2,807,230 | 9/1957 | Brammar | 118/19 |
| 3,357,398 | 12/1967 | Gross | 118/20 |
| 3,438,353 | 4/1969 | Pellegrini | 118/19 |
| 3,937,176 | 2/1976 | Nicholson et al. | 118/19 |
| 3,991,225 | 11/1976 | Blovin | 427/3 |
| 4,245,580 | 1/1981 | Okawara | 118/20 |
| 4,444,810 | 4/1984 | Huttlin | 427/212 |
| 4,476,804 | 10/1984 | Glatt et al. | 118/20 |
| 4,499,847 | 2/1985 | Dungitschik | 118/19 |

FOREIGN PATENT DOCUMENTS

| | | |
|---|---|---|
| 1551973 | 8/1968 | France . |
| 2003267 | 9/1969 | France . |
| 2502466 | 10/1982 | France . |
| 42-11868 | 7/1967 | Japan . |
| 1198187 | 8/1965 | Netherlands . |

Primary Examiner—Janyce A. Bell
Attorney, Agent, or Firm—Frishauf, Holtz, Goodman & Woodward

[57] ABSTRACT

A rotatable drum has means for spraying a coating material onto a localized area of the cascading tablet surface of a tumbling bed of tablets being rotated in the drum. Means (not shown) is also provided for supplying drying air into the drum to dry the coated tablets. Open-ended tubular members mounted inside the drum, pass through the tumbling bed of tablets and completely beneath the localized area as the drum is rotated. The members thus extract tablets from the stagnant core of the tablet bed and distribute the extracted tablets onto the cascading tablet surface so as to hasten the coating process.

14 Claims, 5 Drawing Figures

TABLET COATING APPARATUS AND METHOD

This application is a continuation, of application Ser. No. 805,188, filed Dec. 4, 1985, now abandoned.

BACKGROUND OF THE INVENTION

This invention relates to apparatus and method for the coating of tablets and concerns tablet coating apparatus of the kind including a rotatable drum, means for spraying a coating material onto the surface of a tumbling bed of tablets being rotated in the drum and means for supplying drying air to the bed.

SUMMARY OF THE INVENTION

According to the apparatus aspect of this invention, the spraying means is arranged to spray the coating material onto a localized area of the cascading tablet surface of the tumbling bed of tablets and the apparatus is provided with at least one open-ended, tubular member mounted inside the drum so as to rotate with the drum and positioned to pass through the tumbling bed of tablets and completely beneath said localized area of the cascading tablet surface with one open end of the member foremost, as the drum is rotated.

The method for the coating of tablets according to this invention comprises rotating a bed of tablets in a drum, spraying a localized area of the cascading tablet surface of the tumbling bed of tablets with the coating material, and continuously passing an open-ended, tubular member through the tumbling bed of tablets and completely beneath said localized area of the cascading tablet surface to extract tablets from the core of the tablet bed and distribute them in the cascading tablet surface above said localized area of the cascading tablet surface.

Preferably, the tubular member or members are angled to deflect tablets in the direction of the rotational axis of the drum and preferably also, successive tubular members are provided to deflect tablets in opposite directions. The tubular members act to increase the frequency at which all tablets in a tumbling bed of tablets are presented to the coating spray, consequently reducing the coating time cycle and the applied amount of solution necessary to obtain a uniform thickness of coating throughout the batch.

The shorter time cycle produces other economic advantages in plant operating costs and in particular, energy saving in the use of drying air.

Regarding the quality of the tablets, uniform coating thickness throughout the batch is particularly desirable when the coating includes a therapeutically active ingredient. It also gives a closer control over disintegration, better colour distribution and greater protection against the absorption of moisture.

In the traditional sugar coating process for tablets in which syrup is ladled onto the tumbling bed of tablets, the build-up of coating relies upon the transfer of the syrup from tablet to tablet during tumbling. Following the application of the syrup, the tablets roll in a syrupy mass before gradually falling away and separating prior to the drying air being applied.

Unlike sugar coating, in the film coating of tablets using aqueous or organic solvents as a carrier, little or no material transfer takes place between tablets during the film coating process. Coating relies entirely on contact with the aqueous or organic coating spray which dries almost instantly. It is therefore important that all tablets pass many times under the spray during the coating cycle.

A further problem when tumbling a bed of tablets in a revolving drum is the abraiding of the tablets and therefore the coating process has to be a compromise between tablet movement and tablet wear. This problem increases as the table batch load increases, the tablet size increases and the hardness of the tablets decreases. The drum speed also becomes more critical. It is therefore an advantage when coating tablets and especially friable tablets to keep the drum speed low to eliminate wear, but at the same time, create an efficient and gentle re-direction of the tablets in the core of the tablet bed so that all the tablets pass under the spray.

A further reason why good mixing is imperative is, in order to take advantage of the advanced coating solutions now available, unlike the early spray coatings where solids in solution were fairly low, that the new coatings have a high solids content, allowing much faster tablet coating build-up. But, this can present problems of uneven coating unless thorough mixing is taking place.

A specific embodiment of the present invention in both its apparatus and method aspects will now be described by way of example, and not by way of limitation, with reference to the accompanying drawings.

DETAILED DESCRIPTION

Figure 1:
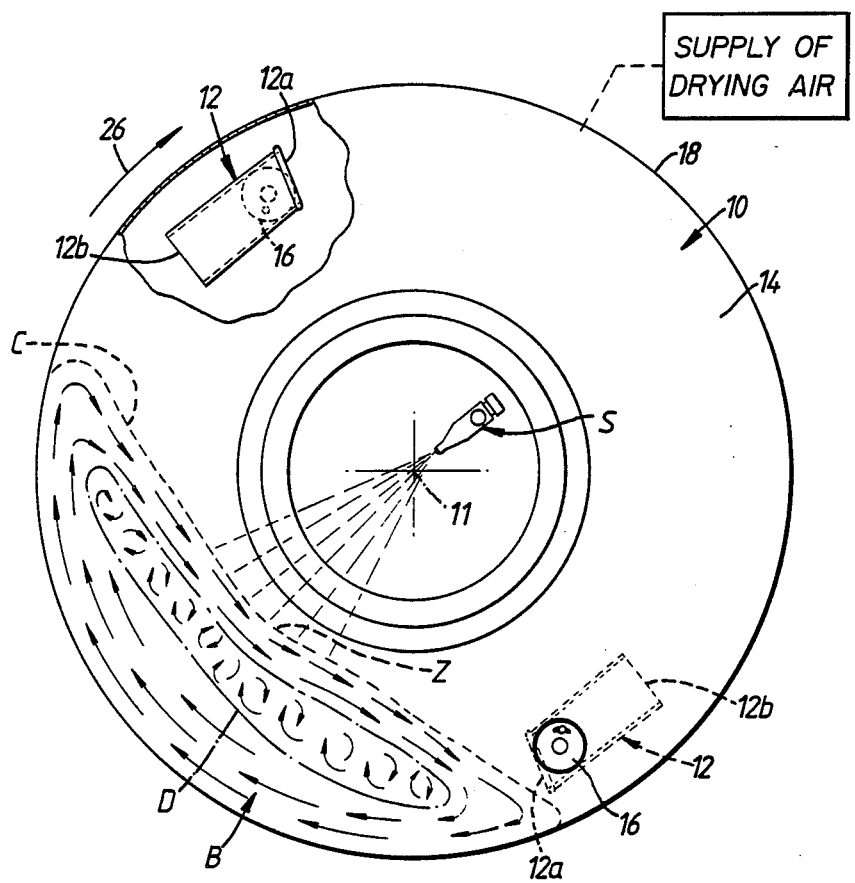
FIG. 1 is a front view of an apparatus of this invention showing the position of the tumbling bed of tablets during the coating process.

Referring now to the accompanying drawings, the drum 10 rotates clockwise about a horizontal axis of rotation 11. Two angularly adjustable open ended tubular members 12 are positioned diagonally opposite one another and mounted one on each outwardly inclined imperforate drum side wall 14 by a pivoting arrangement 16 and each about an horizontal axis disposed adjacent the foremost open end 12a of the member 12. The rearmost or discharge end 12b of each member 12 can be raised or lowered in relation to the perforated, cylindrical wall 18 of the drum. The height of the discharge ends 12b of the members 12 is adjusted to suit the depth of tablet bed B which may vary between a full batch load and a half full batch load. The members 12 are positioned to pass completely below that central localized area Z of the cascading surface C of the tumbling tablet bed being sprayed with the coating material through spray means S to prevent spray coating of the members 12.

The members 12 are carried at an angle with respect to the walls 14 of the drum. The mouth 12a of each member 12 is of flattened shape in the direction of the axis 11 and the member is mounted with its mouth in spaced relation to the adjacent wall 14 of the drum, the mouth extending across the drum towards the other wall 14 to a position beyond the centre of the drum. The open discharge end 12b of the member is of similar flattened shape and extends from the same side of centre of the drum into close proximity with the opposite wall 14 of the drum.

A further feature of the members 12 is that all their walls are tapered outwards from the mouth 12a to the discharge end 12b. This prevents tablets from wedging or jamming inside the members 12 as they pass through the tablet bed.

In operation with the drum revolving clockwise in the direction of arrow 26, the bulk of the tablets takes up a position B as shown in the lower left hand quadrant of the drum as seen in FIG. 1. Tablets positioned adjacent the perforated cylinder wall 18 of the drum are carried round by the wall and travel in an upward direction before cascading down past the coating spray means S fixedly positioned and directed inside the drum adjacent its axis of rotation 11. As the central layers of the bed are approached, the speed of this upward movement of the tablets in the central layer diminishes until the opposing gravitational forces finally tend to create a slow moving stagnant core D of small numbers of orbiting tablets indicated by the continuous chain dotted line in FIG. 1.

As the tumbling tablet bed rolls over the mouth of the members 12 in turn, and the members 12 become submerged within this stagnant core D of tablets, the void created in the tablet bed at the opposite end of each member 12 is filled by tablets falling into the void, thus preventing the escape of tablets which fill the member 12. The tablets which fill the member 12 are, therefore, carried up through the surface of the tablet bed above the spray means S and tablets filling the member 12 are released as the discharge end of the member 12 emerges above the surface of the tablet bed and the tablets cascade over the surface of the bed and pass under the coating spray. At the same time, due to the transverse angular mounting of the members 12, a cross mixing action takes place from front to rear and vice versa of the drum.

Using an apparatus as described above with reference to the accompanying drawings, excellent uniformly coated tablets have been produced using a high solid content coating spray at drum speeds of 2 RPM with a total load of 350 kg in a time of 35 minutes.

Figure 2:
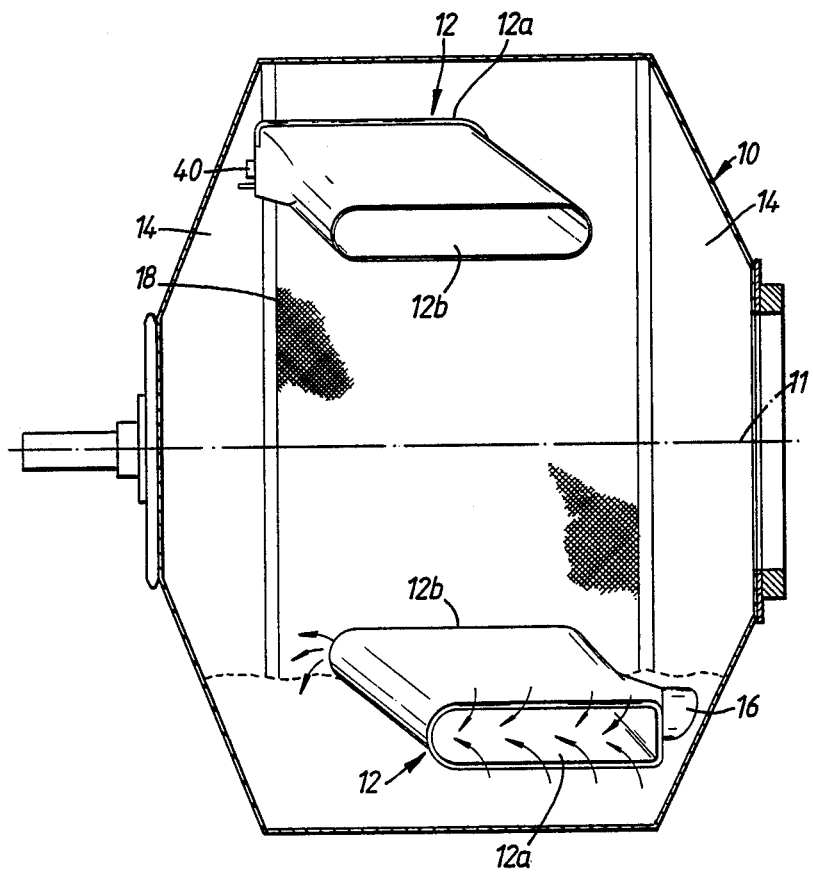
FIG. 2 is a cross section.

FIG. 2 shows the members 12 adjustably mounted off the walls 14 of the drum 10 on pivots 40 with the discharge end 12b of the member capable of being raised or lowered in relation to the cylindrical wall 18 of the drum. The members 12 are attached to the pivoting arrangement 16 at a transverse angle so that the tablets are not only lifted through the bed B and deposited in the cascading stream, but also moved across the bed from front to rear and vice versa.

Figure 3:
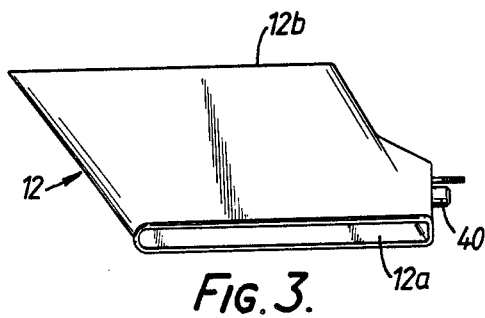
FIG. 3 shows a pictorial view of one of the tubular members.

FIG. 3 shows a pictorial view of one member 12 with its tubular wall tapering outwards from the mouth 12a of the member to the discharge end 12b of the member. Because of its open ended tubular shape, the member 12 passes easily through the bed B of tablets creating little resistance, thus preventing damage to the tablets. Also, due to their tubular shape which fills with tablets during operation, the members 12 do not restrict the volume of the drum, and consequently the batch load. Due to the low resistance offered to the tablets and the clean smooth shape of the tubular members 12, a simple one point fixing is all that is required, allowing the members 12 to be easily removed for cleaning.

Figure 4A:
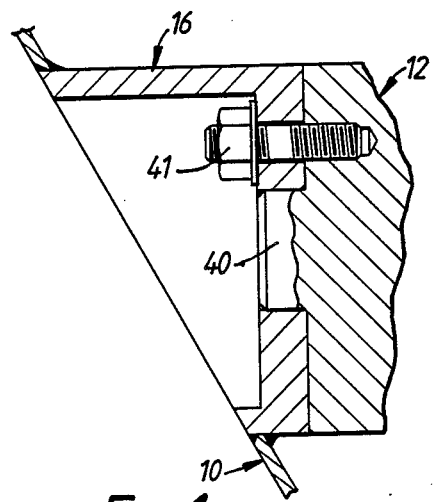
FIGS. 4a and 4b show a detail of the apparatus.
Figure 4B:
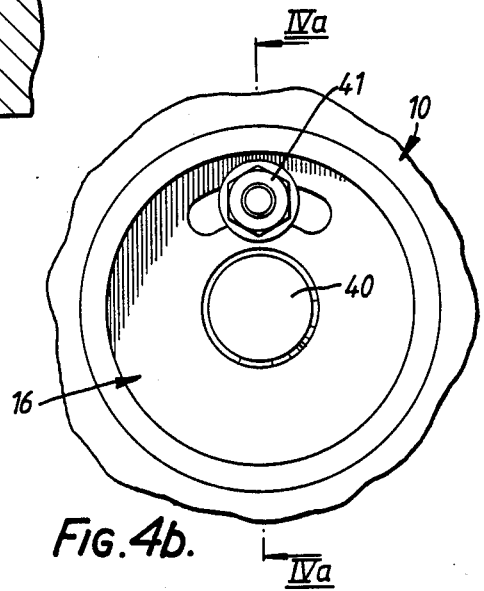

FIGS. 4a and 4b show the pivoting arrangement 16 with an offset fixing bolt 41. Each member 12 can be adjusted after loosening its fixing bolt 41, according to the depth of bed B and if necessary can be adjusted after installation of the bed B from outside the bed and while positioned in the bed, without trapping or damaging any of the tablets in the bed.

The major axis dimension of the mouth 12a of each member 12 should preferably be 3 to 4 times the minor axis dimension of the mouth and the major axis dimension of the mouth should be such that the mouth reaches at least half way across the drum 10.

While two adjustable members 12 have been described, only one member 12 or more than two members 12 could be provided. The member or members 12 could be fixed, i.e. non-adjustable, where the apparatus is to be used with a constant batch load.

The supply of drying air in FIG. 1, but may be as in the machine described in British Pat. No. 1,195,527. This Patent otherwise describes a machine to which the present invention may be applied.

We claim:

1. Tablet coating apparatus comprising:
   a rotatable drum for containing a plurality of tablets which form a tumbling bed of tablets during rotation of the drum,
   means for spraying a coating material onto the surface of the tumbling bed of tablets being rotated in the drum,
   means for supplying drying air to the bed of tablets, the spraying means being arranged to spray the coating material onto a localized area of a cascading tablet surface of the tumbling bed of tablets,
   at least one open-ended, tubular member mounted inside the drum and being adapted to rotate with the drum and being positioned to pass through the tumbling bed of tablets and completely beneath said localized area of the cascading tablet surface with one open end of the tubular member foremost and another open end thereof rearmost as the drum is rotated, so that tablets beneath said cascading tablet surface fill said tubular member and fall out of said rearmost open end thereof to thereby extract tablets from a core portion of the tumbling tablet bed and distribute them onto the cascading tablet surface above said localized area.

2. Apparatus as claimed in claim 1 in which said at least one tubular member is angled to deflect tablets in the direction of the rotational axis of the drum.

3. Apparatus as claimed in claim 2 comprising a plurality of said tubular members, successive ones of which are angled to deflect tablets in opposite directions.

4. Apparatus as claimed in claim 1 in which said foremost and rearmost open ends of said tubular member are a mouth and discharge end, respectively, and wherein said at least one tubular member has walls which are tapered outwards from the mouth of the tubular member to the discharge end of the tubular member.

5. Apparatus as claimed in claim 1 in which said at least one tubular member is of flattened shape in the direction of the axis of rotation of the drum.

6. Apparatus as claimed in claim 5 in which said foremost and rearmost open ends of said tubular member are a mouth and discharge end, respectively, and wherein said at least one tubular member is mounted with its mouth in spaced relation to an adjacent side wall of the drum, the mouth extending across the drum towards the other side wall of the drum to a position beyond the centre of the drum, the discharge end of the tubular member being of similar flattened shape and extending from the same side of the centre of the drum into close proximity with said opposite wall of the drum, the tubular member being mounted at an angle with respect to the side walls of the drum.

7. Apparatus as claimed in claim 6 in which said drum side walls are outwardly inclined.

8. Apparatus as claimed in claim 1 in which said at least one tubular member is mounted angularly adjustable inside said drum to permit raising or lowering its rearmost end with respect to an intermediate wall portion of the drum.

9. Apparatus as claimed in claim 8 in which said at least one tubular member is pivotally mounted to the drum adjacent its said foremost open end.

10. Apparatus as claimed in claim 8 in which said at least one tubular member is mounted so as to be angularly adjustable from outside the drum.

11. A method for coating tablets comprising:
slowly rotating a batch of tablets in a drum to produce a tumbling bed of the tablets in a lower quadrant of the drum,
spraying a localized area of a cascading tablet surface of the tumbling bed of tablets with a coating material,
supplying air into the drum to dry the tablets, and
continuously passing an open-ended, tubular member through the tumbling bed of tablets and completely beneath said localized area of the cascading tablet surface so that tablets beneath said cascading tablet surface pass into a foremost open end of said tubular member and through said tubular member and fall out of a rearmost open end of said tubular member to thereby extract tablets from a core portion of the tumbling tablet bed and distribute them onto the cascading tablet surface above said localized area of the cascading tablet surface.

12. A method as claimed in claim 11 including laterally deflecting tablets extracted from the core of the tablet bed using said open-ended tubular member.

13. A method as claimed in claim 11 including spraying said localized area of the cascading tablet surface with a coating material comprising an aqueous or organic solvent carrier having a high solid content.

14. Apparatus as claimed in claim 9 in which said at least one tubular member is mounted so as to be angularly adjustable from outside the drum.

* * * * *